United States Patent
Fleming

[15] 3,643,767
[45] Feb. 22, 1972

[54] CLUTCH MECHANISM HAVING POWER DISENGAGEMENT

[72] Inventor: Philip F. Fleming, West Bend, Wis.
[73] Assignee: Gehl Company, West Bend, Wis.
[22] Filed: Nov. 27, 1970
[21] Appl. No.: 93,063

[52] U.S. Cl.................192/21, 192/48.91, 192/101, 146/107
[51] Int. Cl.....................F16d 11/04, F16d 21/04
[58] Field of Search............192/21, 33, 48.91, 50, 89 A, 192/101; 146/107

[56] References Cited

UNITED STATES PATENTS

| 962,567 | 6/1910 | Hancock | 192/101 |
| 1,405,001 | 1/1922 | Reichelt | 192/89 A UX |
| 2,332,743 | 10/1943 | Morris | 192/89 A X |
| 2,388,407 | 11/1945 | Hansen | 192/101 |

Primary Examiner—Allan D. Hermann
Attorney—James E. Nilles

[57] ABSTRACT

A power shift mechanism for causing a clutch to be disengaged by the power of the shaft of the transmission. In other words the mechanism is shifted out of gear under its own power and with little effort on the part of the operator. The mechanism is particularly useful in clutching arrangements for feed rolls of a forage harvester for example, when the rolls become clogged with an excess or slug of material and it is otherwise difficult to shift the clutch out of engagement. The mechanism includes a shifting assembly which first acts to shift a cam means out of the way to a position that permits the shiftable clutching part to be engaged and reverse feed roll direction, and then acts to permit the cam means to cause the shiftable part of the clutch to be forcibly disengaged due to the power of the shaft on which it is splined.

4 Claims, 14 Drawing Figures

INVENTOR:
PHILIP F. FLEMING
BY: James E. Nilles
ATTORNEY

INVENTOR:
PHILIP F. FLEMING
BY: James E. Miller
ATTORNEY

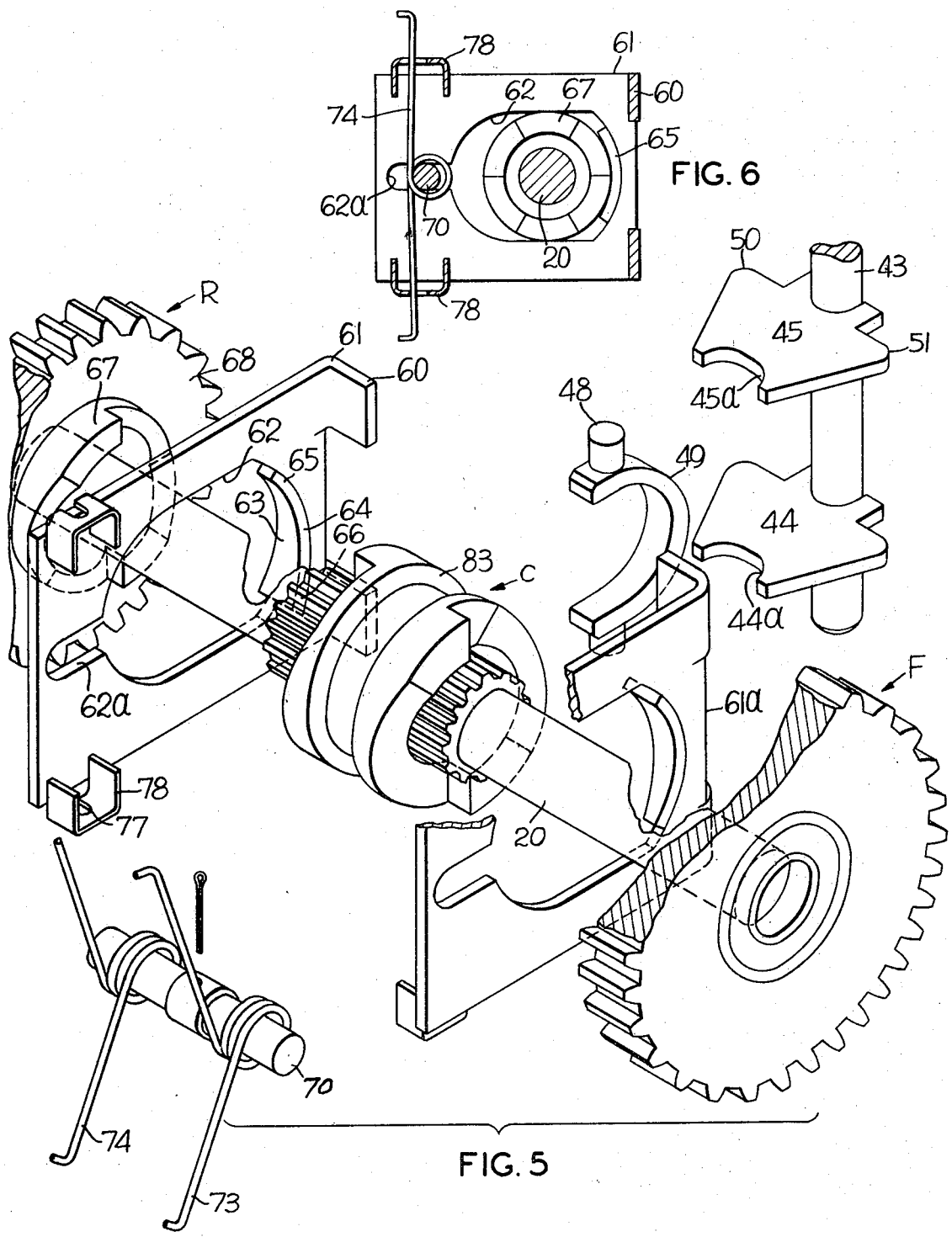

INVENTOR:
PHILIP F. FLEMING
BY: James E. Nilles
ATTORNEY 3,643,767

CLUTCH MECHANISM HAVING POWER DISENGAGEMENT

BACKGROUND OF THE INVENTION

In forage harvesters or the like where the feed rolls must be frequently disengaged in order to permit slugs of material to clear themselves in the chopping cylinder before continued intake of the crop material, it has been conventional practice to provide clutches having a part shifted by the movement of an operator's lever. Heretofore however, when the feed rolls became jammed with a slug of material, it was very difficult for the operator to forcibly cause the shiftable clutch part to move out of engagement.

SUMMARY OF THE PRESENT INVENTION

The present invention provides a shifting mechanism which utilizes the power of the shaft being driven to forcibly cause shifting of one of the clutch parts and consequently disengaging the clutch. The arrangement is such that the operator of the vehicle, such as a forage harvester having feed rolls that are to be clutchable to the power drive, can manually engage the clutch so as to commence feed roll action and this usually requires no great effort on the part of the operator. However, when the feed rolls become jammed with a slug of material, the mechanism of the present invention includes means shiftable by the operator, which means permits a cam on the carrier to come into engagement with the power driven clutch member, thereby causing the clutch member to shift and be disengaged under the influence of the power driven shaft. In other words, the rotation of the power driven shaft causes the shiftable clutch member to ride up on the cam, thereby axially separating the adjacent clutch jaws and disengaging the clutch.

These and other objects and advantages of the present invention will appear hereinafter as this disclosure progress, reference being had to the accompanying drawings.

BRIEF DESCRIPTION OF THE DRAWINGS

FIG. 5 is a perspective, exploded view of the shiftable clutch mechanism of the present invention, some parts being shown as broken away for clarity;

FIG. 6 is a transverse, sectional view taken generally along the line 6—6 in FIG. 2, but on a reduced scale;

DESCRIPTION OF A PREFERRED EMBODIMENT

Figure 1:
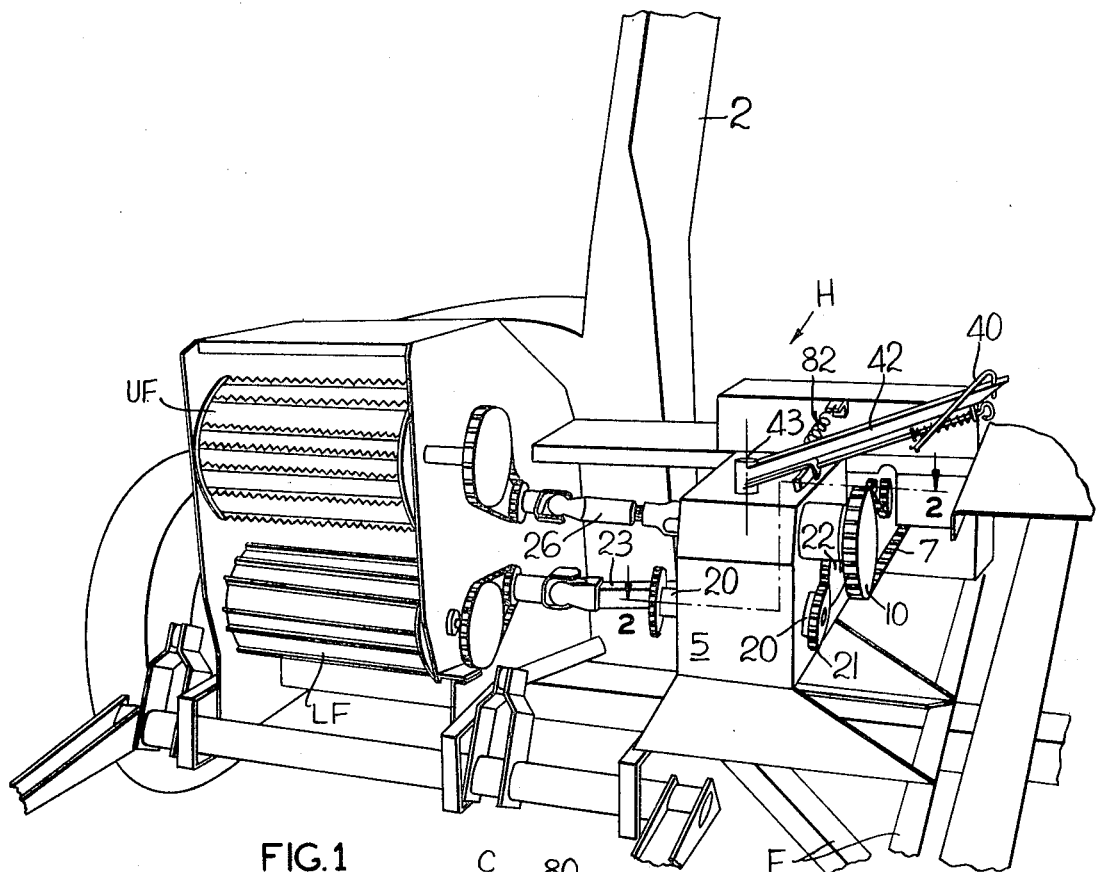
FIG. 1 is a perspective view of a forage harvester embodying the present invention, certain parts being shown as broken away or removed for the sake of clarity.

The invention has been shown in FIG. 1 as used in connection with a forage harvester H of the type that is adapted to be pulled by its forwardly extending frame F by a tractive vehicle. The harvester includes a lower feed roll LF and an upper feed roll UF which are rotatably driven so as to receive the crop from the field which is delivered to it by the pickup attachment (not shown). The crop passes through both the feed rolls, the latter of which feed the crop to a chopping cylinder (not shown), and from which the chopped material is then delivered by the spout 2 to a trailing wagon or the like (not shown).

The two feed rolls rotate in a direction towards one another at their adjacent peripheries so that the material passes between the rolls. The amount of material delivered to the rolls varies and sometimes a slug of particularly heavy mass of material is engaged between the rolls. Under these circumstances, it is often necessary to shift the drive mechanism which drives the rolls out of engagement so that the machine can clear itself of these heavy slugs before additional crop material is fed to the chopping cylinder.

Heretofore it has been a difficult task for the operator to shift the rolls out of engagement, that is to declutch the rolls when they were jammed with excess material, and the present invention provides a transmission that is declutched under power of the unit itself when it is desired to stop the feed rolls.

The transmission housing 5 is mounted on the frame of the harvester and an endless chain 7 delivers power to an input sprocket 10 which extends from the housing 5. Chain 7 is driven from the power takeoff shaft (not shown) that in turn is driven by the tractor in the conventional manner. The power input sprocket 10 is fixed to a short stub shaft 11 journaled in the housing and shaft 11 has a smaller gear 12 fixed to it. Gear 12 is in constant mesh with a larger gear 13 which in turn is fixed to a transmission shaft 14 journaled in the housing. A pair of gears 15 and 16 are also fixed to shaft 14. Gear 15 is in constant mesh with a larger forward gear F that rotates freely on a clutch shaft 20 that extends through the housing and outwardly from both sides thereof. Gear 16 is in constant mesh with a reverse idler 17 which is mounted on shaft 18 supported by the housing. The reverse idler 17 is then in constant mesh with a larger reverse gear R that is freely journaled on the clutch shaft 20.

With the transmission thus far described, input power gear means are provided for transmitting power to continuously rotate both the forward gear F and the reverse gear R, in opposite directions, the gears F and R being freely journaled on the clutch shaft 20.

Figure 9:
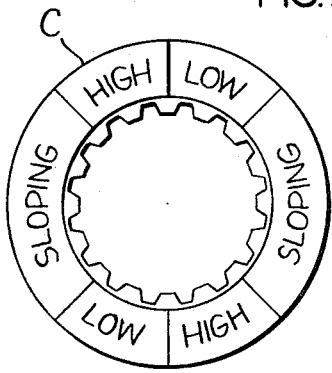
FIG. 9 is an end elevational view of the sliding clutch shown in FIG. 10.
Figure 10:
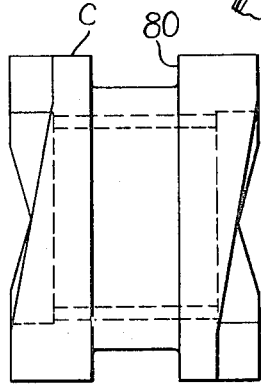
FIG. 10 is a front elevational view of the sliding clutch.
Figure 11:
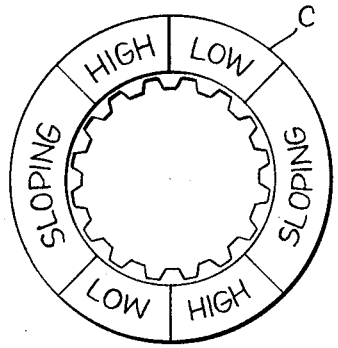
FIG. 11 is an end elevational view of the sliding clutch taken from the opposite end from the FIG. 9 showing.
Figure 12:
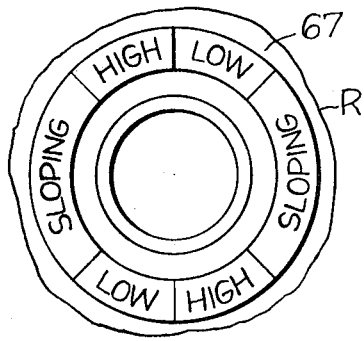
FIG. 12 is a fragmentary side view of the reverse gear jaw which engages with the sliding clutch jaws shown in FIG. 9.
Figure 13:
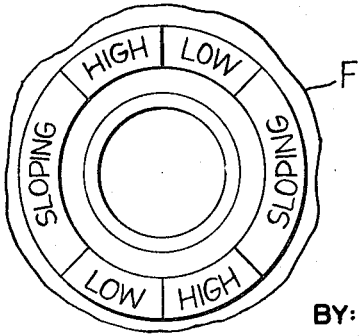
FIG. 13 is a fragmentary side view of the forward gear jaw which engages the sliding clutch jaws shown in FIG. 11.

The gears F and R have clutch jaws located on their inner sides, as shown in FIGS. 12 and 13. The clutch member C has jaws on each of its axial ends for engagement with the jaws of the reverse gear R or the forward gear F, and this clutch and its jaws are clearly shown in FIGS. 9, 10 and 11. This axially shiftable clutch member C is splined to shaft 20 and can be shifted either into engagement with the jaws of gear R or gear F, to cause respectively, reverse or forward rotation of shaft 20.

Power is then transmitted from the clutch shaft 20 to the upper and lower feed rolls as follows. A gear 21 is fixed to shaft 20 on the outside of the housing and is in constant mesh with another gear 22 that is fixed to shaft 23 that extends through the housing. Another gear 24 is fixed to shaft 23 and it is in constant mesh with still another gear 25 that is fixed to shaft 26 journaled in the housing. Thus, shafts 23 and 26, respectively drive the lower and upper feed rolls, and these rolls can be reversed in their direction of feed by engagement of the clutch member C with either the reverse gear R or forward gear F. The means for engaging the clutch member C with either of the gears R or F will now be described.

Figure 8:
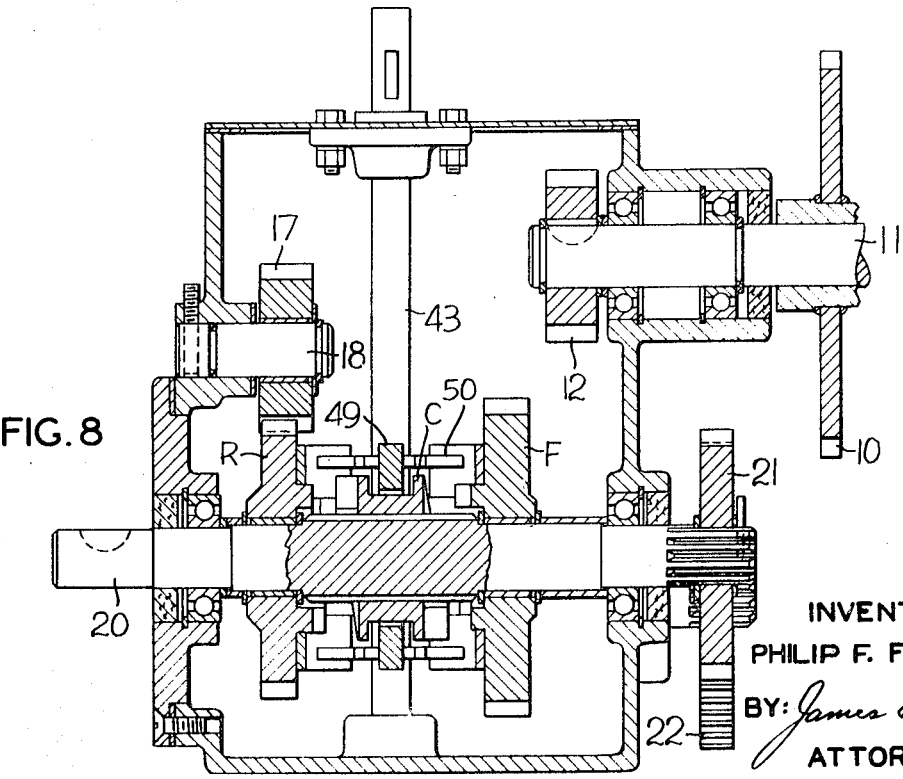
FIG. 8 is a sectional view taken along the line 8—8 in FIG. 7.
Figure 14:
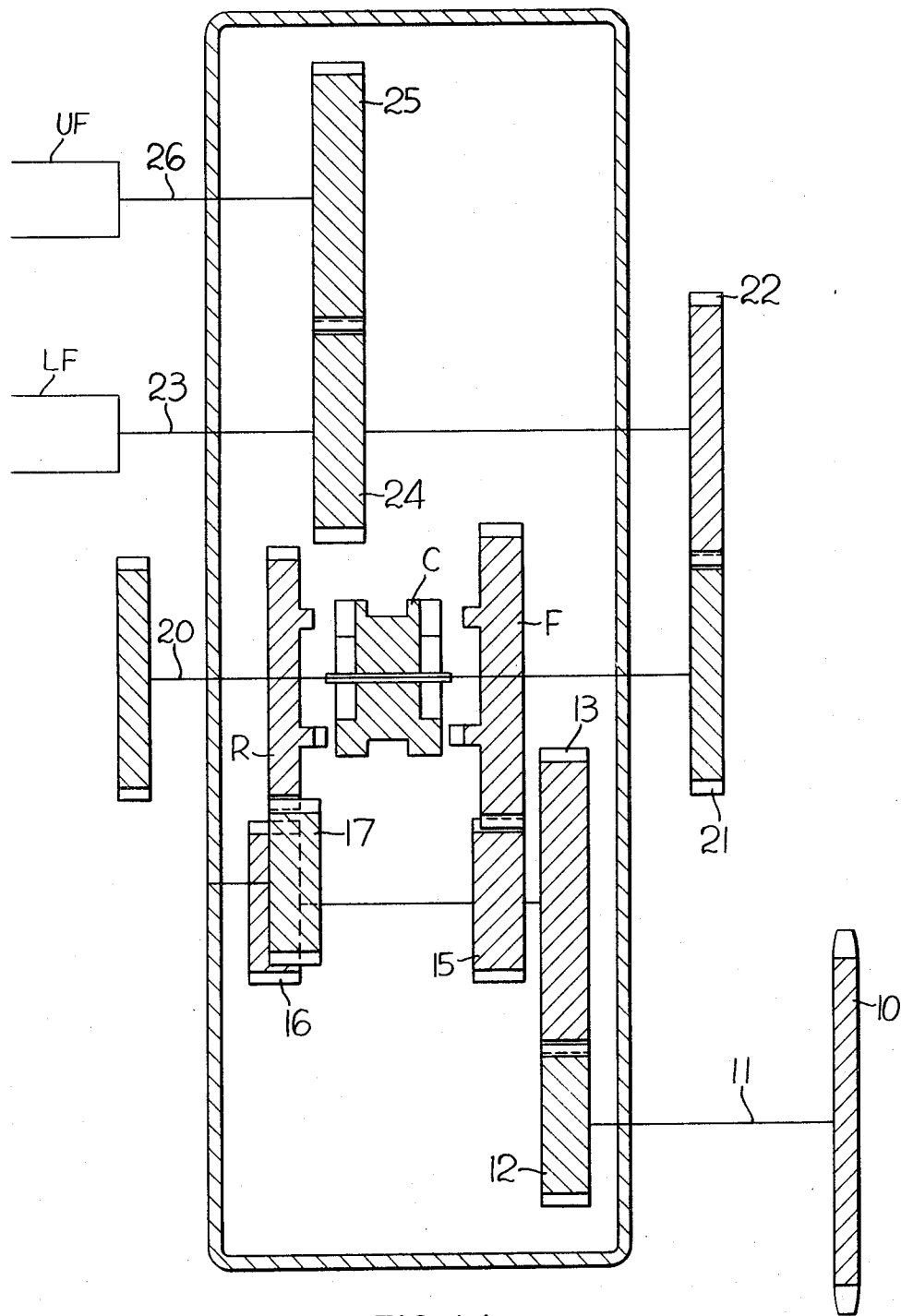
FIG. 14 is a schematic, spread out view of the power transmission.

As shown in FIG. 1, an operator's rod 40 extends forwardly to within easy reach of the operator when he is situated on the tractive vehicle. By pulling this rod 40, the arm 42 is swung to rotate a vertically disposed shifter rod 43. The rod 43 is journaled adjacent its upper and lower ends in the housing H as shown in FIG. 8. A pair of vertically spaced wing plates 44 and 45 are fixed as by welding to the rod 43, as shown in FIG. 5, and rotate with the rod as the latter is actuated by the operator. The free ends of these plates have an arcuate slot 44a and 45a formed therein to form fork tines which engage the trunnion pins 48 or the shifter yoke 49. The wing plates also have a rounded corner 50 and 51 at their rear corners.

Figure 2:
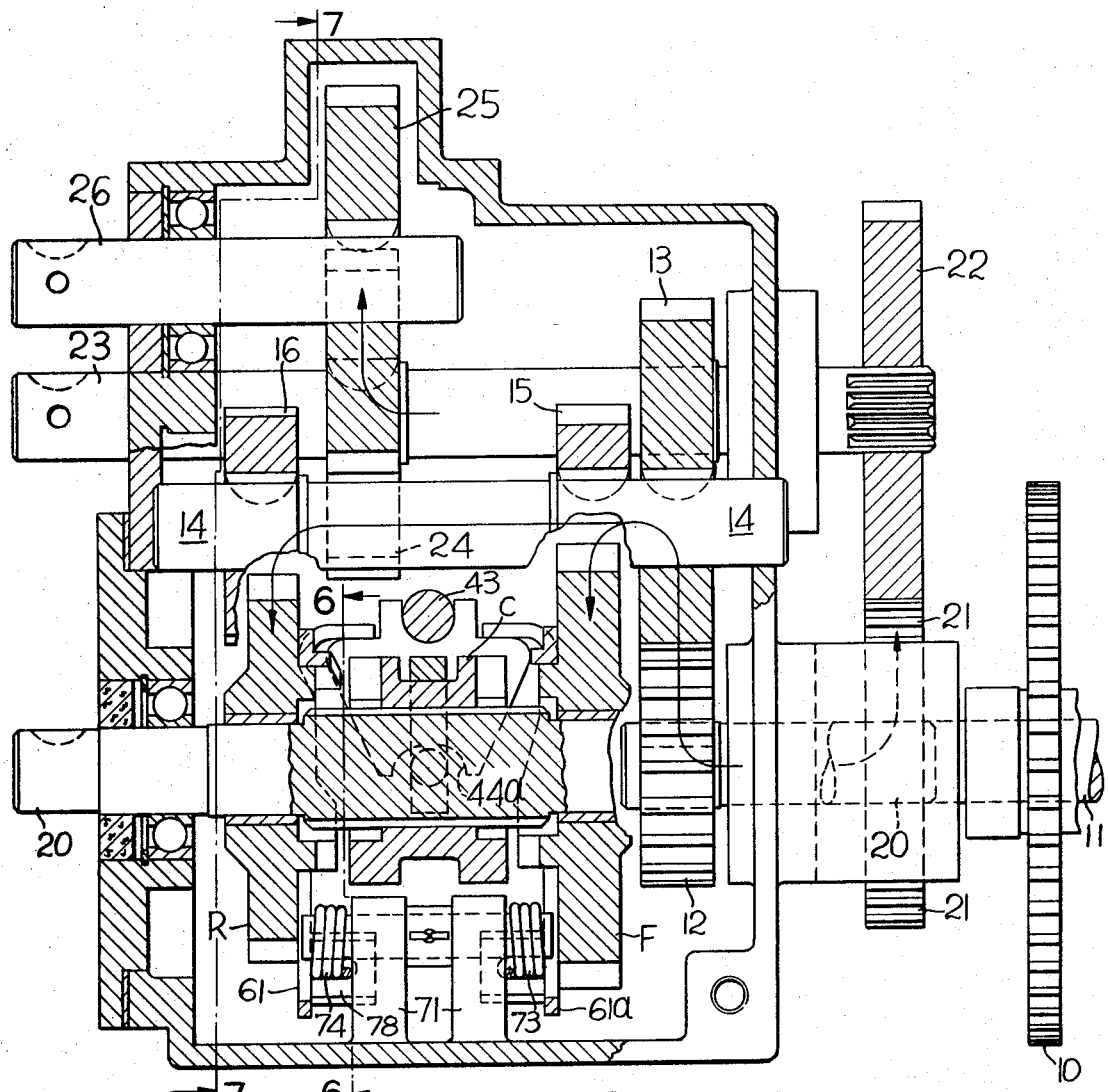
FIG. 2 is a cross-sectional plan view of the transmission shown in FIG. 1 and taken generally along the line 2—2 in that view, but on an enlarged scale.
Figure 3:
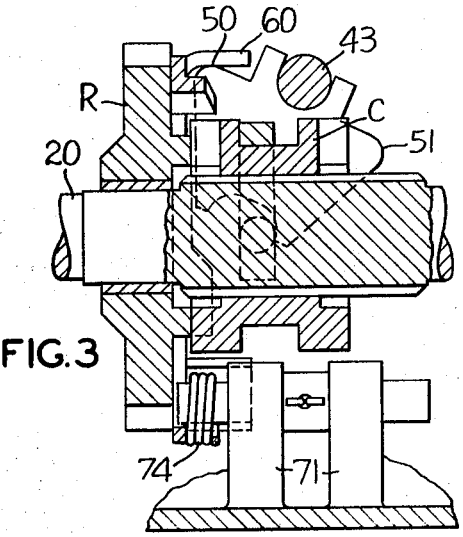
FIG. 3 is a cross section, fragmentary view of a portion of the device shown in FIG. 2, but showing the sliding clutch when being shifted into engagement with the jaws of the reverse gear.
Figure 4:
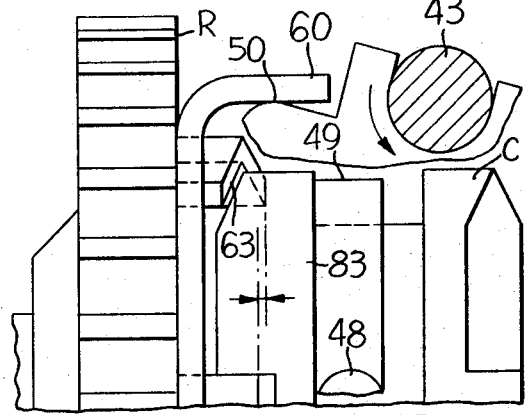
FIG. 4 is a fragmentary, plan view of the sliding clutch shown in FIG. 3 when it is about to be engaged by the spring loaded cam carrier.
Figure 7:
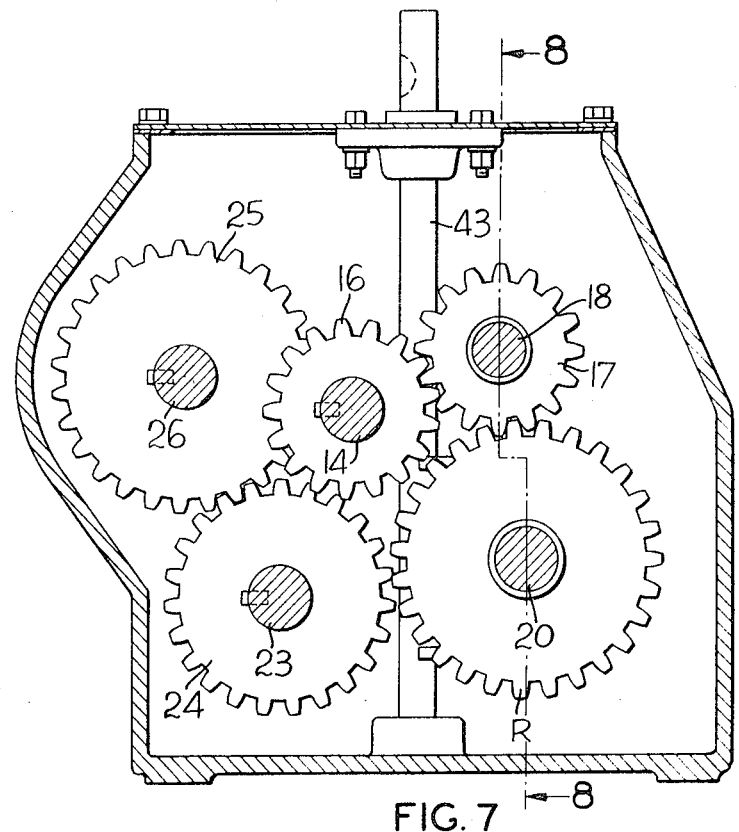
FIG. 7 is a transverse sectional view taken generally along the line 7—7 in FIG. 2.

The clutch C is shown in the neutral position in FIG. 2 and is shown as being shifted to engage the reverse gear R in FIG. 3. The operation of the clutch in shifting from the neutral position shown in FIG. 2 to the reversing direction shown in FIG. 3 will now be described.

A pair of cam carriers 61 and 61a are provided for the reverse gear and its clutch jaws and for the forward gear and its clutch jaws, respectively. As the structure and operation of the carriers is the same, only one will be described in detail.

Referring to FIGS. 2 and 3, during the initial shifting movement of the shifter assembly which is comprised of rod 43 and wing plates 44 and 45, the shoulders 50 of the plates first act to engage a flange 60 of the cam carrier 61. The cam carrier is fabricated from heavy sheet steel and has an elongated aperture 62 generally centrally located therein, and the carrier also has a smaller slot 62a which merges with the aperture 62. This cam carrier also has a cam member 63 welded thereto and which includes a cam surface 64 having a low end 65 and a high end 66, in an axial direction. As will appear, this cam surface is slideable into engagement with the adjacent jaws of the clutch member C. The opening 62 is also elongated in a transverse direction so that the cam carrier 61 can slide transversely over the periphery of the hub 67 of the gear R.

An anchor shaft 70 is fixed in the lugs 71 formed integral with the interior of the housing, and a pair of torsion springs 73 and 74 are mounted on shaft 70 and the ends of these springs extend through apertures 77 of brackets 78 which are welded to the inner surface of the cam carrier. Recesses or slots 62a of the cam carriers surround the shaft 70 and help guide the cam in its transverse sliding movement. The springs 73, 74 act to bias the cam carrier to a position in which the cam 63 is held against the hub 67 of the gear R, that is against the outside diameter of the gear jaws.

The opening 62 of the carrier is of such a size that it nests over the hub 67 of the reverse gear and the carrier lies against the inner face 68 of the gear. The hub of the clutch member C however, is slightly larger than the diameter of the hub 67 of the gear. The cam surface 64 is so shaped that it complements the radial slope of the jaws of the sliding clutch C. Consequently, there is a rotational position of the engaged gear and the sliding clutch at which the cam will axially nest between the gear face 68 and the sloping jaws of the sliding clutch, the jaws of the gear being of a smaller diameter than the jaws of the sliding clutch. The rotation of the engaged gear and clutch causes the jaws of the sliding clutch to climb the cam surface 64 of the cam 63, and consequently forces the sliding clutch C axially away from the gear R thereby providing disengagement of the jaws of the clutch. Thus there is a power shifting due to the driving effect of shaft 20, of the clutch to the disengaged position.

In the neutral position, both cams 63 bear against the periphery of the hub of their respective gears. In other words, they bear against the periphery of the gear jaws and at the same time bear against the rounded corners 50, 51 of the wing plates of the shifter assembly. The sliding clutch C and yoke 49 assume a disengaged position while the spring loaded handle and shifter fork are in the centrally located detent position. Rotation of the shifter assembly by the operator in a clockwise direction places the parts in the position indicated in FIG. 3. The wing plate of the shifter fork has shifted the cam which has been laying against the gear away from the shaft. In this condition, the sliding clutch C can engage with gear R. Clearance is built into the central groove 80 of the sliding clutch, which groove receives the trunnioned yoke and clearance is also in the fork tines which actuate the yoke. This clearance assures that the cam will be moved out of the way by rotation of the fork before the sliding clutch C is moved axially into place. In other words, the initial movement of the shifter assembly causes the cam to radially shift out of the way of the clutch.

The manual control rod 42 (FIG. 1) is held in this position against the spring 82 connected to it for as long a period as the reverse condition of the rolls is required, and this is generally a matter of seconds. When the control handle is released by the operator, the spring 82 returns the detent to the neutral position. The torsion spring 74 holds the cam plate against the then retreating wing plates of the shifter fork until the cam 63 contacts the periphery of the sliding clutch jaws. Since these are rotating, the nesting position will occur in no more than one-half revolution at which time the cam 63 will slip into contact with the jaws of the clutch and disengage the clutch as above indicated. It is noted that the clearance in the sliding clutch groove 80 and the fork tines permits the shifter fork and cam to rotate into place without contacting the sliding clutch thereby relieving the operator of the necessity for mechanical disengagement.

The operation of the clutch from neutral to the forward direction of rotation is the opposite of that above described and the action between the forward cam plate and the forward gear is as above described.

RESUME

The clutch mechanism provided by the present invention includes a clutch shaft having a pair of continuously and oppositely rotating gears freely journaled thereon, and also has an axially shiftable clutch member splined to the shaft for rotation therewith and for selective engagement with either one of the oppositely rotating gears. A cam means including a cam carrier is provided between the shiftable clutch member and each of the gears and this carrier has a cam for engagement with the adjacent jaws of the shiftable clutch member. The carrier is slideable over the hub of its associated gear, which gear hub is of a smaller diameter than the hub of the clutch member. Shifting means are provided for first shifting the cam carrier out of the way of the shiftable clutch member and then the clutch member is shifted into engagement with the gear. After a short period of engagement in which the feed rolls are reversed, the operator releases his control lever and this permits the spring biased cam carrier to return to its original position. In this position, the cam of the cam carrier is engaged by the power driven clutch member which forcibly causes the axial movement of the clutch member to the disengaged position.

Thus, the present invention provides a means for power shifting the clutch into the disengaged position.

The invention finds particular utility in a forage harvester where feed rolls or other attachments of the machine, such as a mower sickle or corn harvesting head must be stopped periodically during the crop feeding operation in order to prevent an excess slug of crop from overloading the machine. Under these conditions, the jaws of the sliding clutch are transmitting high torque. To manually disengage the clutch in this condition is very difficult and requires linkages of impractical designs. The present invention provides power means for disengaging the clutch under any power transmitting condition.

I claim:

1. Power disengaging clutch mechanism comprising, a clutch shaft journaled for rotation in either direction, a clutch member splined to said shaft for axially shifting thereon and having clutch jaws on each axial end, a forward gear rotatably journaled on said shaft at one end of said clutch member and having jaws for engagement with said member, a reverse gear rotatably journaled on said shaft and having jaws for engagement with said member, input power means for continuously rotating said forward gear and said reverse gear in the opposite directions, output shaft means mounted in said housing, gear means connected between said clutch shaft and said output shaft means for causing rotation thereof, cam means slideably mounted relative to and adjacent each end of said clutch member, said cam means being shiftable out of engaging alignment with the jaws of said gears and also shiftable into engaging alignment with the jaws of the adjacent gear, and shifting means for selectively shifting said cam means and also for axially shifting said clutch member, said shifting means engaging and shifting a selected cam means to said nonengaging alignment prior to the axial shifting of said clutch member into engagement with the gear adjacent said selected cam means, and means for returning said selected cam means to said engaging alignment with said clutch member to positively shift the latter in an axial direction out of engagement with said gear.

2. Clutch mechanism comprising, a housing, a clutch shaft journaled in said housing for rotation in either direction, a clutch member splined to said shaft for axially shifting thereon in opposite directions and having clutch jaws adjacent each axial end thereof, a forward gear rotatably journaled on said shaft at one end of said clutch member and having jaws for engagement with the adjacent jaws of said member, a reverse gear rotatably journaled on said shaft at the other end of said clutch member and having jaws for engagement with the adjacent jaws of said member, input power gear means for continuously rotating said forward gear in one direction and said reverse gear in the opposite direction, output shaft means mounted in said housing, gear means connected between said clutch shaft and said output shaft means for causing rotation thereof; a pair of cam carriers and each including a cam, one carrier slideably mounted adjacent each end of said clutch member between a first position in which their cams are out of engaging alignment with the jaws of the gears and a second position in which their cams are engagingly aligned with the jaws of their respective adjacent gear; shifting means for selectively shifting said carriers and also for axially shifting said clutch member in opposite directions, said shifting means having a portion engaging and shifting a selected carrier to said first position prior to the axial shifting of said clutch member into engagement with the gear adjacent said selected carrier, and means for returning said selected carrier to said second engaging position as said shifting means is returned to a neutral position, whereby said clutch member engages the cam of said selected carrier and is positively shifted in an axial direction and out of engagement with said gear due to the rotation of said clutch member against said cam.

3. Clutch mechanism comprising, a housing, a clutch shaft journaled in said housing for rotation in either direction, a clutch member splined to said shaft for axially shifting thereon in opposite directions, said member having clutch jaws on each axial end thereof, a forward gear rotatably journaled on said shaft at one end of said clutch member and having jaws on its side adjacent said member for engagement with the adjacent jaws of said member, a reverse gear rotatably journaled on said shaft at the other end of said clutch member and having jaws on its side adjacent said member for engagement with the adjacent jaws of said member, input power gear means for continuously rotating said forward gear in one direction and said reverse gear in the opposite direction, a pair of output shafts mounted in said housing and extending therefrom, gear means connected between said clutch shaft and at least one of said output shafts for causing rotation thereof, a pair of cam carriers and each including a cam, one carrier slideably mounted at each end of said clutch member and between the clutch member and the forward and reverse gears, said carriers being shiftable between a first position in which their cams are out of engaging alignment with the jaws of their respective adjacent gear and a second position in which their cams are engagingly aligned with the jaws of their respective adjacent gear, shifting means for selectively shifting said carriers in a transverse direction and also for axially shifting said clutch member in opposite directions, said shifting means having a portion engaging a selected carrier and shifting said carrier to said first position prior to the axial shifting of said clutch member into engagement with the gear adjacent said selected carrier, and means for returning said selected carrier to said second engaging position as said shifting means is returned to a neutral position, whereby said clutch member engages the cam of said selected carrier and is positively shifted in an axial direction and out of engagement with said gear due to the rotation of said clutch member against said cam.

4. In a forage harvester having a pair of oppositely rotating feed rolls, clutch mechanism comprising, a housing on said harvester, a clutch shaft journaled in said housing for rotation in either direction, a clutch member splined to said shaft for axially shifting thereon in opposite directions, said member having clutch jaws on each axial end thereof, a forward gear rotatably journaled on said shaft at one end of said clutch member and having jaws on its side adjacent said member for engagement with the adjacent jaws of said member, a reverse gear rotatably journaled on said shaft at the other end of said clutch member and having jaws on its side adjacent said member for engagement with the adjacent jaws of said member, input power gear means for continuously rotating said forward gear in one direction and said reverse gear in the opposite direction, a pair of output shafts mounted in said housing and extending therefrom and having means for connection to said feed rolls, gear means connected between said clutch shaft and at least one of said output shafts for causing rotation thereof, a pair of cam carriers and each including a cam, one carrier slideably mounted at each end of said clutch member and between the clutch member and the forward and reverse gears, said carriers being shiftable between a first position in which their cams are out of engaging alignment with the jaws of their respective adjacent gear and a second position in which their cams are engagingly aligned with the jaws of their respective adjacent gear, shifting means for selectively shifting said carriers in a transverse direction and also for axially shifting said clutch member in opposite directions, said shifting means having a portion engaging a selected carrier and shifting said carrier to said first position prior to the axial shifting of said clutch member into engagement with the gear adjacent said selected carrier, means for returning said selected carrier to said second engaging position as said shifting means is returned to a neutral position, whereby said clutch member engages the cam of said selected carrier and is positively shifted in an axial direction and out of engagement with said gear due to the rotation of said clutch member against said cam; an operator's lever on said harvester and connected to said shifting means for shifting the latter in either direction to cause engagement of either of said reverse or forward gears; and means for returning said lever to a neutral position.

* * * * *